United States Patent
Xu et al.

(10) Patent No.: US 11,514,625 B2
(45) Date of Patent: Nov. 29, 2022

(54) MOTION TRAJECTORY DRAWING METHOD AND APPARATUS, AND DEVICE AND STORAGE MEDIUM

(71) Applicant: BEIJING BYTEDANCE NETWORK TECHNOLOGY CO., LTD., Beijing (CN)

(72) Inventors: Shikun Xu, Beijing (CN); Yandong Zhu, Beijing (CN); Changhu Wang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 34 days.

(21) Appl. No.: 16/979,597

(22) PCT Filed: Dec. 7, 2018

(86) PCT No.: PCT/CN2018/119688
§ 371 (c)(1),
(2) Date: Sep. 10, 2020

(87) PCT Pub. No.: WO2020/037881
PCT Pub. Date: Feb. 27, 2020

(65) Prior Publication Data
US 2021/0166450 A1    Jun. 3, 2021

(30) Foreign Application Priority Data
Aug. 21, 2018 (CN) .......... 201810956271.2

(51) Int. Cl.
*G06T 11/20* (2006.01)
*G06T 7/215* (2017.01)
*G06T 7/194* (2017.01)
*G06T 7/246* (2017.01)

(52) U.S. Cl.
CPC ............ *G06T 11/203* (2013.01); *G06T 7/194* (2017.01); *G06T 7/215* (2017.01); *G06T 7/246* (2017.01);
(Continued)

(58) Field of Classification Search
CPC .......... G06T 2207/10016; G06T 7/246; G06T 11/60; G06T 7/20; G06T 7/73;
(Continued)

(56) References Cited

U.S. PATENT DOCUMENTS

2011/0199461 A1* 8/2011 Horio .................. G06T 7/20
348/46
2015/0091944 A1* 4/2015 Matsumoto ............ G06T 7/277
345/633

(Continued)

FOREIGN PATENT DOCUMENTS

| CN | 103929685 | 7/2014 |
| CN | 104093001 | 10/2014 |

(Continued)

OTHER PUBLICATIONS

1st Office Action dated Apr. 17, 2020 for Chinese Patent Application No. 201810956271.2. English Translation Provided.
(Continued)

*Primary Examiner* — Xiao M Wu
*Assistant Examiner* — Scott E Sonners
(74) *Attorney, Agent, or Firm* — Thomas | Horstemeyer, LLP

(57) ABSTRACT

Provided are a method for drawing a motion track, an electronic device and a storage medium. The method includes the following steps: multiple video frames are acquired, where the multiple video frames includes a current video frame and at least one video frame before the current video frame (S110); a display position of a target motion
(Continued)

element in each video frame and a display position of a background pixel point in each video frame are identified (S120); a display position of the target motion element of each video frame in the current video frame is calculated (S130); an actual motion track of the target motion element is drawn in the current video frame according to the display position of the target motion element of each video frame in the current video frame, and the current video frame in which the drawing is completed is displayed (S140).

14 Claims, 5 Drawing Sheets

(52) U.S. Cl.
CPC .............. *G06T 2207/10016* (2013.01); *G06T 2207/30221* (2013.01); *G06T 2207/30241* (2013.01)

(58) Field of Classification Search
CPC ............. G06T 7/70; G06T 2207/30196; G06T 2207/30241; G06T 11/203; G06T 2207/30232; G06T 11/206; G06T 7/215; G06T 7/248; G06T 7/74; G06T 5/50; G06T 7/12; G06T 7/11; G06T 7/254; G06T 7/194; G06V 20/52; G06V 20/58; G06V 20/00; G06V 40/20; G06V 10/40
See application file for complete search history.

(56) References Cited

U.S. PATENT DOCUMENTS

| | | | |
|---|---|---|---|
| 2017/0358103 | A1 | 12/2017 | Shao et al. |
| 2018/0005055 | A1 | 1/2018 | Jeong et al. |
| 2018/0336694 | A1* | 11/2018 | Chen ........................ G06T 7/215 |
| 2021/0133435 | A1* | 5/2021 | Yoshinaga ............. G06V 40/20 |

FOREIGN PATENT DOCUMENTS

| | | |
|---|---|---|
| CN | 104751488 | 7/2015 |
| CN | 105279771 | 1/2016 |
| CN | 105827946 | 8/2016 |
| CN | 106033615 | 10/2016 |
| CN | 106340032 | 1/2017 |
| CN | 106952286 | 7/2017 |
| CN | 107360377 | 11/2017 |
| CN | 108229294 | 6/2018 |

OTHER PUBLICATIONS

International Search Report and Written Opinion dated May 20, 2019 for PCT Patent Application No. PCT/CN2018/119688. English Translation Provided.

First Search Report dated Mar. 24, 2020 for Chinese Patent Application No. 201810956271.2.

* cited by examiner

MOTION TRAJECTORY DRAWING METHOD AND APPARATUS, AND DEVICE AND STORAGE MEDIUM

CROSS-REFERENCE TO RELATED APPLICATIONS

This is a National Stage Application, filed under 35 U.S.C. 371, of International Patent Application No. PCT/CN2018/119688, filed on Dec. 7, 2018, which claims priority to Chinese patent application No. 201810956271.2 filed on Aug. 21, 2018, contents of both of which are incorporated herein by reference in their entireties.

TECHNICAL FIELD

The present disclosure relate to the technical field of computer vision, for example, to a method for drawing a motion track, an electronic device and a storage medium.

BACKGROUND

With the development of internet technologies, videos may be shot by a camera and transmitted to an intelligent terminal through a network so that videos from around the world, such as sports videos, road videos and game videos, can be viewed on the intelligent terminal.

Because most of the videos are shot by the camera, the content of the videos seen by the audience is determined by the shooting view angle of the camera. If the shooting view angle of the camera is not fixed and a motion element exists in a video, it is difficult to show the motion track of the motion element in the video. For example, it is difficult to show the actual motion track of a football or a player in a football match video. As a result, it is difficult for the audience to acquire the actual motion track and the watching experience is poor.

SUMMARY

The present disclosure provides a method and an apparatus for drawing a motion track, an electronic device and a storage medium, thereby enriching the display information of a video and improving the watching experience of the audience.

The present disclosure provides a method for drawing a motion track. The method includes steps described below.

A plurality of video frames is acquired. The plurality of video frames includes a current video frame and at least one video frame before the current video frame. A display position of a target motion element in each of the plurality of video frames and a display position of a background pixel point in each of the plurality of video frames are identified.

A display position of the target motion element of each of the plurality of video frames in the current video frame is calculated according to the display position of the target motion element in each of the plurality of video frames and the display position of the background pixel point in each of the plurality of video frames.

An actual motion track of the target motion element is drawn in the current video frame according to the display position of the target motion element of each of the plurality of video frames in the current video frame, and the current video frame in which the drawing is completed is displayed.

The present disclosure further provides an apparatus for drawing a motion track. The apparatus includes an acquisition module, an identification module, a calculation module and a drawing module.

The acquisition module is configured to acquire a plurality of video frames. The plurality of video frames includes a current video frame and at least one video frame before the current video frame. The identification module is configured to identify a display position of a target motion element in each of the plurality of video frames and a display position of a background pixel point in each of the plurality of video frames.

The calculation module is configured to calculate a display position of the target motion element of each of the plurality of video frames in the current video frame according to the display position of the target motion element in each of the plurality of video frames and the display position of the background pixel point in each of the plurality of video frames.

The drawing module is configured to draw an actual motion track of the target motion element in the current video frame according to the display position of the target motion element of each of the plurality of video frames in the current video frame, and display the current video frame in which the drawing is completed.

The present disclosure further provides an electronic device. The electronic device includes at least one processor and a memory. The memory is configured to store at least one program. The at least one program, when executed by the at least one processor, causes the at least one processor to perform the method for drawing the motion track of any one of the embodiments.

The present disclosure further provides a computer-readable storage medium. The computer-readable storage medium is configured to store computer programs. The computer programs, when executed by a processor, perform the method for drawing the motion track of any one of the embodiments.

According to the technical scheme of the present disclosure, the plurality of video frames is acquired, the display position of the target motion element in each of the plurality of video frames and the display position of the background pixel point in each of the plurality of video frames are identified, and the display position of the target motion element of each of the plurality of video frames in the current video frame is calculated, so that the effect of the shooting view angle is eliminated, and the actual position of the target motion element of each of the plurality of video frames in the current video frame is obtained. According to the display position of the target motion element of each of the plurality of video frames in the current video frame, the actual motion track of the target motion element is drawn in the current video frame and the current video frame in which the drawing is completed is displayed, so that the actual motion track of the target motion element is drawn in the current video frame in addition to the original image, the display information of the video is enriched, and the watching experience of the audience is improved.

DETAILED DESCRIPTION

Figure 1:
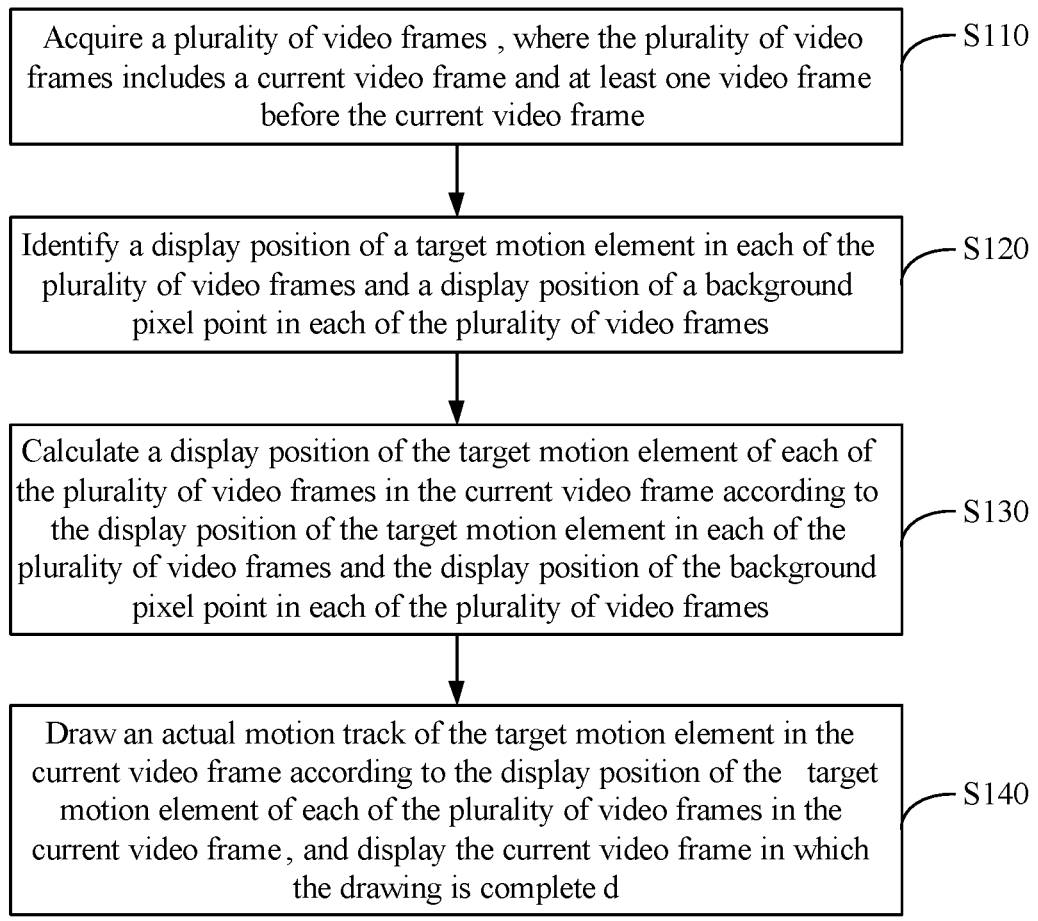
FIG. 1 is a flowchart of a method for drawing a motion track according to an embodiment one of the present disclosure.

The present disclosure will be described below in conjunction with the drawings and embodiments. The embodiments described below are used for explaining the present disclosure and not intended to limit the present disclosure. In addition, for convenience of description, only part, not all, of structures related to the present disclosure are illustrated in the drawings.

Embodiment One

FIG. 1 is a flowchart of a method for drawing a motion track according to the embodiment one of the present disclosure. The present embodiment may be applicable to a case where a motion track of a target motion element is drawn and displayed in a video frame. The method may be performed by an apparatus for drawing a motion track. The apparatus may be composed of hardware and/or software and is generally integrated in an electronic device. The method according to the present embodiment includes steps described below.

In step S110, multiple video frames are acquired, where the multiple video frames include a current video frame and at least one video frame before the current video frame.

In one embodiment, multiple continuous video frames may be acquired from a video, or multiple non-continuous video frames may be acquired from a video.

The last video frame in the multiple video frames is the current video frame. At least one video frame is before the current video frame. In the present embodiment, an actual motion track of the target motion element may be drawn in the current video frame.

In step S120, a display position of the target motion element in each of the multiple video frames and a display position of a background pixel point in each of the multiple video frames are identified.

In one embodiment, the display position of the target motion element and the display position of the background pixel point are identified through an image recognition model. The image recognition model may be a neural network model based on deep learning.

The target motion element refers to a dynamic element in the video. For example, in a football match video, the target motion element refers to a player or a football. As another example, in a road video, the target motion element refers to a vehicle or a pedestrian.

The background pixel point refers to a pixel point corresponding to a static element in the video frame. The static element is, for example, a goal, a billboard or a lawn in the football match video, or a traffic sign, a road or a traffic light in the road video. In one example, the static element is identified in each video frame, a pixel point is selected in the static element and used as the background pixel point, and the position of the background pixel point is acquired. In another example, motion vectors of multiple pixel points in adjacent video frames are calculated through an optical flow field algorithm, that is, an optical flow field is established. If the multiple pixel points do not correspond to the target motion element, the motion vectors of the multiple pixel points should be the same. Based on this property, background pixel points with the same motion vector are acquired, and then the positions of the background pixel points are acquired.

In step S130, a display position of the target motion element of each of the multiple video frames in the current video frame is calculated according to the display position of the target motion element in each of the multiple video frames and the display position of the background pixel point in each of the multiple video frames.

In most cases, the display position of the target motion element in each of the multiple video frames is affected by a shooting view angle. That is, after the effect of the shooting view angle is eliminated, an actual position of the target motion element is obtained from the display position of the target motion element.

In one embodiment, step S1310 includes steps described below.

In the first step, a first relative motion vector of the target motion element in each of the multiple video frames relative to the target motion element in the current video frame is calculated according to the display position of the target motion element in each of the multiple video frames.

In one example, if a display position of a football in a video frame 1 is a coordinate A and the display position of the football in the current video frame is a coordinate B, the first relative motion vector is $\overrightarrow{AB}$.

In the second step, a second relative motion vector of a background image in each of the multiple video frames relative to a background image in the current video frame is calculated according to the display position of the background pixel point in each of the multiple video frames.

In the preceding example, if the display position of the background pixel point in the video frame 1 is a coordinate C and the display position of the background pixel point in the current video frame is a coordinate D, the second relative motion vector is $\overrightarrow{CD}$.

In the third step, a third relative motion vector of the target motion element of each of the multiple video frames in the current video frame relative to the target motion element in the current video frame is obtained by subtracting the second relative motion vector from the first relative motion vector both of which correspond to the same each of the multiple video frames.

In the preceding example, the third relative motion vector of the football in the video frame 1 relative to the football in the current video frame is obtained according to $\overrightarrow{AB}$-$\overrightarrow{CD}$.

In the fourth step, the display position of the target motion element of each of the multiple video frames in the current video frame is obtained by translating a display position of the target motion element in the current video frame according to the third relative motion vector.

In the preceding example, assuming that the display position of the football in the current video frame is a coordinate E, a display position F of the football of the video frame 1 in the current video frame is obtained by translating the coordinate E according to $\vec{AB}$-$\vec{CD}$.

In one embodiment, after the display position of the target motion element of each of the multiple video frames in the current video frame is obtained, a difference algorithm is performed between multiple display positions to add new display positions to make the actual motion track smoother.

In step S140, an actual motion track of the target motion element is drawn in the current video frame according to the display position of the target motion element of each of multiple video frames in the current video frame, and the current video frame in which the drawing is completed is displayed.

Figure 2:
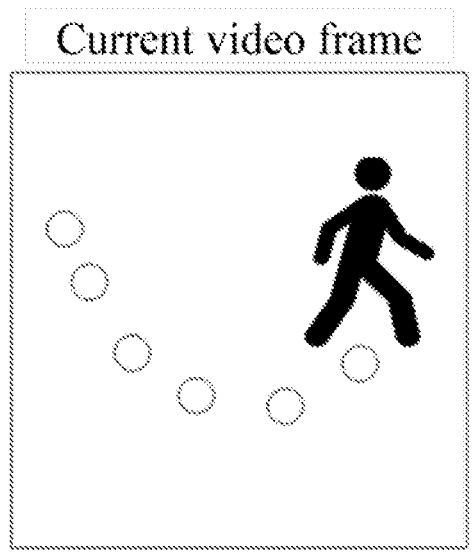
FIG. 2 is a schematic diagram of an actual motion track displayed in a current video frame according to the embodiment one of the present disclosure.

In one embodiment, the actual motion track is drawn through a geometrical shape, a color block or at least one line style. FIG. 2 is a schematic diagram of the actual motion track displayed in the current video frame according to the embodiment one of the present disclosure. In FIG. 2, the actual motion track is showed through circles.

According to the technical scheme of the present embodiment, the multiple video frames are acquired, the display position of the target motion element in each of the multiple video frames and the display position of the background pixel point in each of the multiple video frames are identified, and the display position of the target motion element of each of the multiple video frames in the current video frame is calculated, so that the effect of the shooting view angle is eliminated, and the actual position of the target motion element of each of the multiple video frames in the current video frame is obtained. According to the display position of the target motion element of each of the multiple video frames in the current video frame, the actual motion track of the target motion element is drawn in the current video frame and the current video frame in which the drawing is completed is displayed, so that the actual motion track of the target motion element is drawn in the current video frame in addition to the original image, the display information of the video is enriched, and the watching experience of the audience is improved.

Embodiment Two

Figure 3:
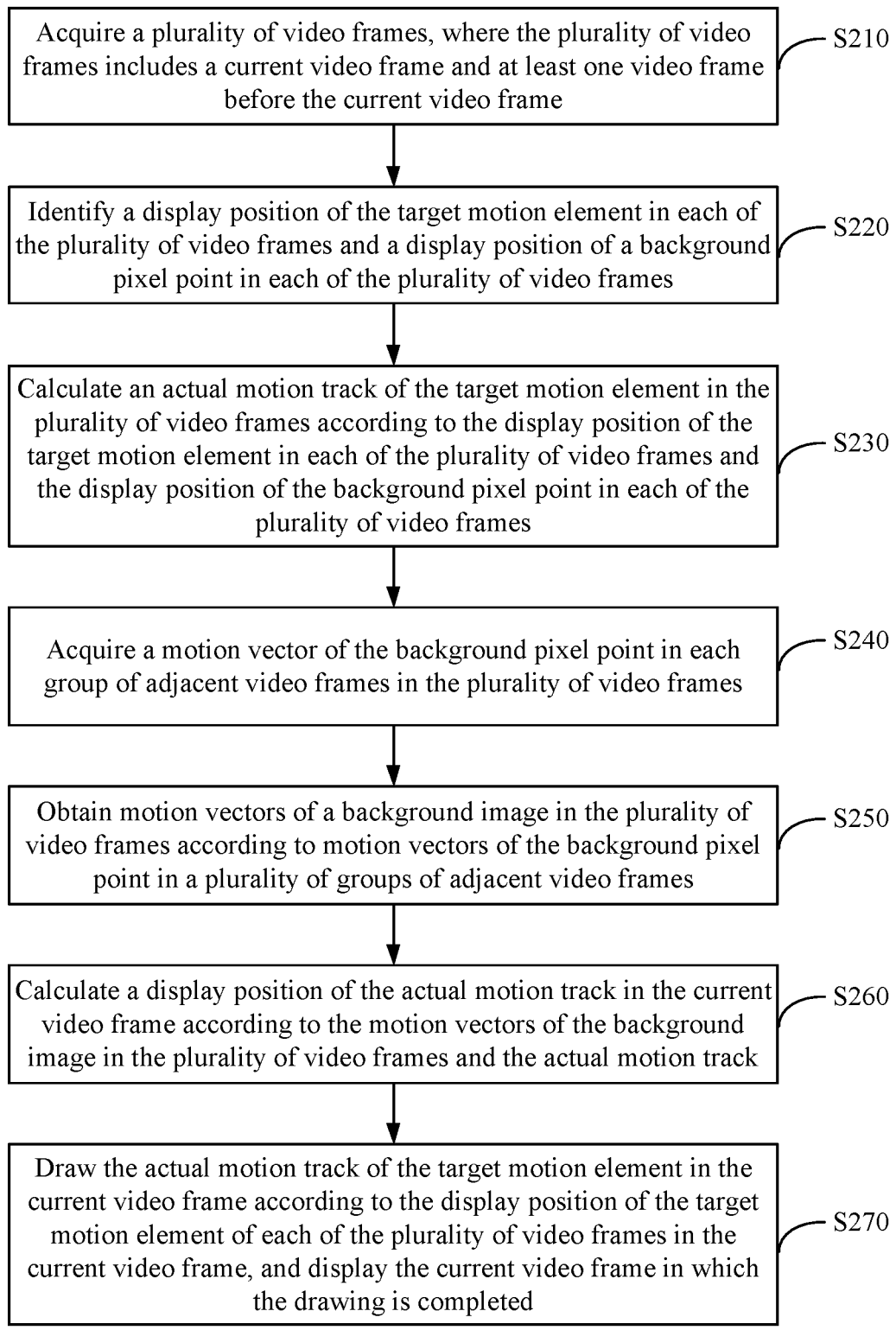
FIG. 3 is a flowchart of a method for drawing a motion track according to an embodiment two of the present disclosure.

FIG. 3 is a flowchart of a method for drawing a motion track according to the embodiment two of the present disclosure. The present embodiment is described based on the scheme in the preceding embodiment. The method according to the present embodiment includes steps described below.

In step S210, multiple video frames are acquired, where the multiple video frames include a current video frame and at least one video frame before the current video frame.

In step S220, a display position of the target motion element in each of the multiple video frames and a display position of a background pixel point in each of the multiple video frames are identified.

In step S230, an actual motion track of the target motion element in the multiple video frames is calculated according to the display position of the target motion element in each of the multiple video frames and the display position of the background pixel point in each of the multiple video frames.

The actual motion track refers to a track formed by connecting the actual position of the target motion element in each of the multiple video frames after the effect of the shooting view angle is eliminated.

The shooting view angle (or an observer view angle) may be constant or be inconstant. Based on this, a calculation method of the actual motion track includes two cases described below.

In the first case, if the shooting view angle of the video frame is constant, the display position, that is, the actual position of the target motion element in each of the multiple video frames is identified. The actual motion track is obtained according to the display position of the target motion element of each of the multiple video frames.

In the second case, if the shooting view angle of the video frame is inconstant, and the actual position of the target motion element is affected by the shooting view angle, the actual motion track of the target motion element is calculated through a target-tracking method in a dynamic background. In one embodiment, the target-tracking method in the dynamic background includes, but is not limited to, an optical flow method, a content-aware hashing method, a tracking algorithm based on a covariance matrix and content-aware hashing particle filtering.

In the second case, the calculation method of the actual motion track based on the optical flow method includes steps described below.

In the first step, a motion vector of the target motion element in each group of adjacent video frames is determined according to display positions of the target motion element in each group of adjacent video frames in multiple groups of adjacent video frames in the multiple video frames.

In one embodiment, the display position coordinate of the target motion element in the previous video frame in each group of adjacent video frames is pointed to the display position coordinate of the target motion element in the next video frame in the same each group of adjacent video frames, and the motion vector of the target motion element in the same each group of adjacent video frames is obtained.

In the second step, a motion vector of a background image in each group of adjacent video frames is determined according to display positions of the background pixel point in each group of adjacent video frames in the multiple video frames.

In one embodiment, the position of the background pixel point in the previous video frame in each group of adjacent video frames is pointed to the position of the corresponding background pixel point in the next video frame in the same each group of adjacent video frames, and a motion vector of the background pixel point in the same each group of adjacent video frames is obtained and used as the motion vector of the background image in the adjacent video frames.

In the third step, an actual motion vector of the target motion element in each group of adjacent video frames is obtained according to the motion vector of the target motion element and the motion vector of the background image in the same each group of adjacent video frames.

In one embodiment, the actual motion vector of the target motion element in each group of adjacent video frames is obtained by subtracting the motion vector of the background image from the motion vector of the target motion element both of which correspond to the same each of the plurality of video frames. For example, between the video frame 1 and a video frame 2, the motion vector of the football is $\vec{A}$, the motion vector of the background image is $\vec{B}$, and the actual motion vector of the football is $\vec{A}$-$\vec{B}$.

In the fourth step, the actual motion track of the target motion element in the multiple video frames is obtained according to the actual motion vectors of the target motion element in the multiple groups of adjacent video frames.

In one embodiment, the fourth step includes two implementation modes described below.

In the first implementation mode, the actual motion track of the target motion element in the multiple video frames is obtained by directly connecting the actual motion vectors of the target motion element in the multiple groups of adjacent video frames in the multiple video frames end to end.

Figure 4:
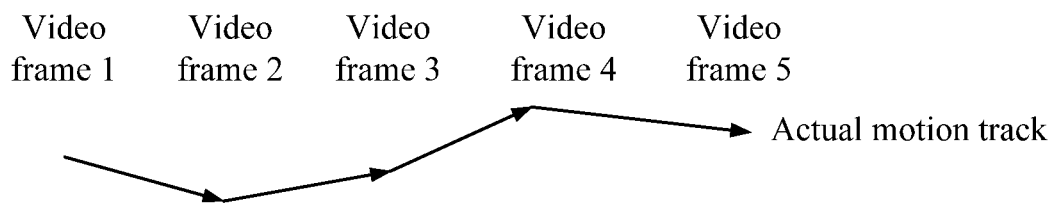
FIG. 4 is a schematic diagram of an actual motion track according to the embodiment two of the present disclosure.

FIG. 4 is a schematic diagram of an actual motion track according to the embodiment two of the present disclosure. FIG. 4 shows the actual motion track of the target motion element in five video frames. The actual motion track is obtained by connecting four actual motion vectors end to end.

In the second implementation mode, from the actual motion vectors of the target motion element in the multiple groups of adjacent video frames, an actual motion vector of the target motion element in one group of the multiple groups of adjacent video frames is acquired as a first actual motion vector. If the magnitude of the first actual motion vector is less than or equal to a preset threshold, the first actual motion vector is stored. If the magnitude of the first actual motion vector is greater than the preset threshold, the first actual motion vector is decomposed into at least two subvectors approaching the actual motion vector and the at least two subvectors are used as new actual motion vectors. The operation of acquiring the first actual motion vector is returned until all the actual motion vectors are acquired. The stored multiple first actual motion vectors are connected end to end to obtain the actual motion track of the target motion element in the multiple video frames.

Figure 5:
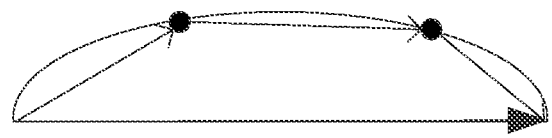
FIG. 5 is a schematic diagram of decomposed actual motion vectors according to the embodiment two of the present disclosure.

The actual motion vector includes a motion direction and the magnitude of the motion vector. If the magnitude of the motion vector is greater, the motion track of the segment is longer, which is not close to the actual motion condition. Based on this, a threshold is preset. If the magnitude of the motion vector is greater than the preset threshold, the actual motion vector is decomposed into at least two subvectors connected end to end. In one embodiment, a curve is drawn between a start point of the actual motion vector and an end point of the actual motion vector. The curvature of the curve is within a preset range to guarantee the curve sufficiently approaches the actual motion vector. At least one point is arbitrarily selected in the curve. Two adjacent points in the curve are connected in a direction from the start point towards the end point to obtain the new actual motion vectors. As shown in FIG. 5, the actual motion vector is decomposed into three subvectors connected end to end. The start point of the first subvector coincides with the start point of the actual motion vector, and the end point of the last subvector coincides with the end point of the actual motion vector.

After the new actual motion vectors are obtained, the magnitude of the new actual motion vectors and the magnitude of the preset threshold are continuously determined, and corresponding operation is performed according to a determination result until the magnitude of all the actual motion vectors are less than or equal to the preset threshold.

The preceding two implementation modes are both applicable to the case where the multiple video frames are continuous or non-continuous.

In step S240, the motion vector of the background pixel point in each group of adjacent video frames in the multiple video frames is acquired.

In step S250, the motion vectors of the background image in the multiple video frames are obtained according to the motion vectors of the background pixel point in the multiple groups of adjacent video frames.

Figure 6:
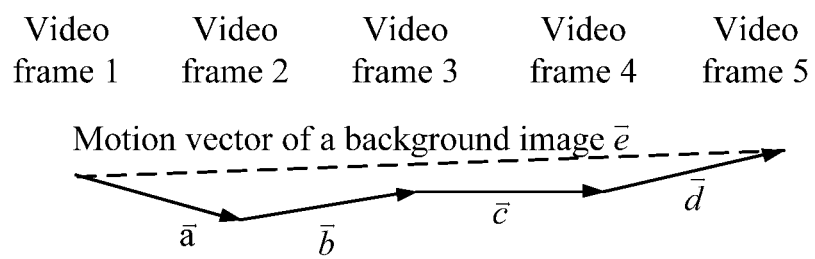
FIG. 6 is a schematic diagram of motion vectors of a background image according to the embodiment two of the present disclosure.

The position of the background pixel point in the previous video frame in each group of adjacent video frames is pointed to the position of the corresponding background pixel point in the next video frame in the same each group of adjacent video frames, and the motion vector of the background pixel point in the group of adjacent video frames is obtained. Then the motion vectors of the background pixel point in the multiple groups of adjacent video frames are added to obtain the motion vectors of the background images in the multiple video frames. As shown in FIG. 6, in the five video frames, the motion vectors of the background pixel point in four groups of adjacent video frames are $\vec{a}$, $\vec{b}$, $\vec{c}$, and $\vec{d}$, respectively. The motion vectors of the background image in the multiple video frames are the motion vectors of the background image from the video frame 1 to the video frame 5.

In step S260, the display position of the actual motion track in the current video frame is calculated according to the motion vectors of the background image in the multiple video frames and the actual motion track.

The display position of the actual motion track in the current video frame is obtained by adding the motion vectors of the background image in the multiple video frames to the actual motion track of the target motion element.

In step S270, the actual motion track of the target motion element is drawn in the current video frame according to the display position of the target motion element of each of the multiple video frames in the current video frame, and the current video frame in which the drawing is completed is displayed.

In the present embodiment, by eliminating the effect of the background image on the target motion element, the actual motion track of the target motion element may be accurately drawn in the current video frame, so that the accuracy of drawing the actual motion track is improved. Moreover, the present embodiment provides two methods for acquiring the actual motion track, so that the actual motion track is close to the actual motion condition, and the displayed actual motion track is more realistic.

Embodiment Three

Figure 7:
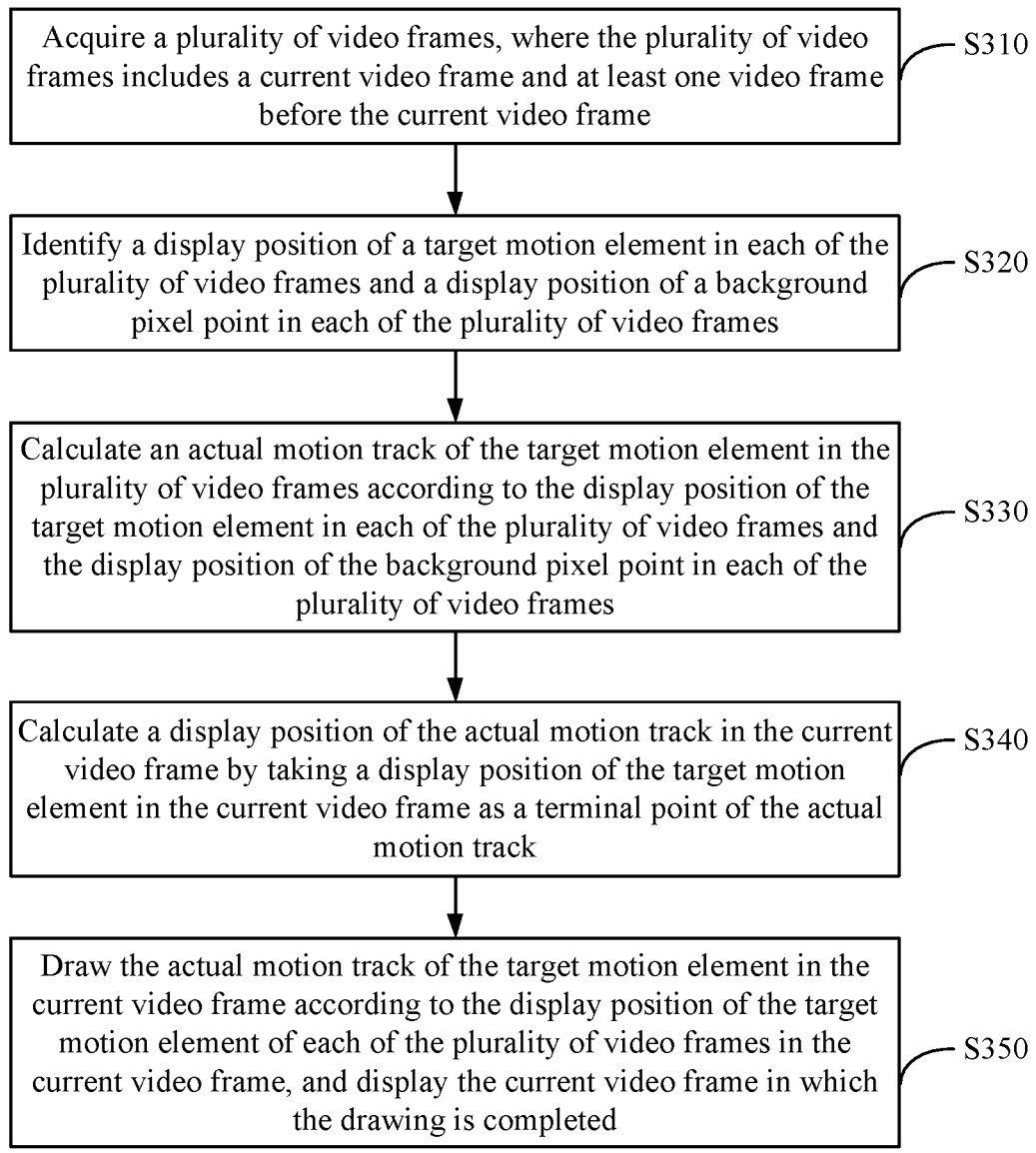
FIG. 7 is a flowchart of a method for drawing a motion track according to an embodiment three of the present disclosure.

FIG. 7 is a flowchart of a method for drawing a motion track according to the embodiment three of the present disclosure. The present embodiment is described based on the preceding embodiment. The method according to the present embodiment includes steps described below.

In step S310, multiple video frames are acquired, where the multiple video frames include a current video frame and at least one video frame before the current video frame.

In step S320, a display position of a target motion element in each of the multiple video frames and a display position of a background pixel point in each of the multiple video frames are identified.

In step S330, an actual motion track of the target motion element in the multiple video frames is calculated according to the display position of the target motion element in each of the multiple video frames and the display position of the background pixel point in each of the multiple video frames.

Step S330 is the same as step S230 in the preceding embodiment, which may be referred to the preceding embodiment and is not described herein again.

In step S340, a display position of the actual motion track in the current video frame is calculated by taking a display position of the target motion element in the current video frame as a terminal point of the actual motion track.

After the actual motion track is obtained, each coordinate point in the actual motion track is translated to make the terminal point coincide with the display position of the target motion element in the current video frame, so that the display position of the actual motion track in the current video frame is obtained.

In step S350, the actual motion track of the target motion element is drawn in the current video frame according to the display position of the target motion element of each of the multiple video frames in the current video frame, and the current video frame in which the drawing is completed is displayed.

In the present embodiment, the display position of the actual motion track in the current video frame is calculated by taking the display position of the target motion element as the terminal point of the actual motion track, the position calculation or translation is performed by taking the actual motion track as the whole, and the motion track is drawn. Thus, the amount of calculation is small, the drawing speed is fast and the real-time demand of playing the video is satisfied.

In the preceding embodiment, to achieve a dynamic display effect of the actual motion track, after the actual motion track of the target motion element is drawn, the method further includes a step of continuing to execute the acquisition operation and the subsequent operations for multiple new video frames. The multiple new video frames include a next video frame relative to the current video frame and at least one video frame before the next video frame.

In one embodiment, the number of the acquired multiple new video frames and the number of the acquired video frames in step S110 may be the same or different.

In one example, the multiple video frames include video frames 1 to 10. The actual motion track of the target motion element is drawn in the current video frame 10, and the current video frame 10 is displayed. Video frames 2 to 11 are continuously acquired, the actual motion track of the target motion element is calculated in the video frames 2 to 11, and the actual motion track of the target motion element is draw in the video frame 11. Then the current video frame 11 is displayed. By analogy, video frames 12, 13 and 14 are displayed in turn, and the actual motion track of the target motion element is drawn in each displayed video frame.

In the present embodiment, by continuing to execute the acquisition operation and the subsequent operations for the multiple new video frames, and dynamically displaying the actual motion track in the video, the watching experience is improved.

Embodiment Four

Figure 8:
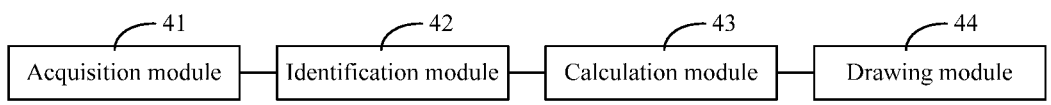
FIG. 8 is a structural diagram of an apparatus for drawing a motion track according to an embodiment four of the present disclosure.

FIG. 8 is a structural diagram of an apparatus for drawing a motion track according to the embodiment four of the present disclosure. The apparatus includes an acquisition module 41, an identification module 42, a calculation module 43 and a drawing module 44.

The acquisition module 41 is configured to acquire multiple video frames. The multiple video frames include a current video frame and at least one video frame before the current video frame. The identification module 42 is configured to identify a display position of a target motion element in each of the multiple video frames and a display position of a background pixel point in each of the multiple video frames. The calculation module 43 is configured to calculate a display position of the target motion element of each of the multiple video frames in the current video frame according to the display position of the target motion element in each of the multiple video frames and the display position of the background pixel point in each of the multiple video frames. The drawing module 44 is configured to draw an actual motion track of the target motion element in the current video frame according to the display position of the target motion element of each of the multiple video frames in the current video frame, and display the current video frame in which the drawing is completed.

According to the technical scheme of the present embodiment, the multiple video frames are acquired, the display position of the target motion element in each of the multiple video frames and the display position of the background pixel point in each of the multiple video frames are identified, and the display position of the target motion element of each of the multiple video frames in the current video frame is calculated, so that the effect of the shooting view angle is eliminated, and the actual position of the target motion element of each of the multiple video frames in the current video frame is obtained. According to the display position of the target motion element of each of the multiple video frames in the current video frame, the actual motion track of the target motion element is drawn in the current video frame and the current video frame in which the drawing is completed is displayed, so that the actual motion track of the target motion element is drawn in the current video frame in addition to the original image, the display information of the video is enriched, and the watching experience of the audience is improved.

In one embodiment, the calculation module 43 is configured to calculate a first relative motion vector of the target motion element in each of the multiple video frames relative to the target motion element in the current video frame according to the display position of the target motion element in each of the multiple video frames; calculate a second relative motion vector of a background image in each of the multiple video frames relative to a background image in the current video frame according to the display position of the background pixel point in each of the multiple video frames; obtain a third relative motion vector of the target motion element of each of the multiple video frames in the current video frame relative to the target motion element in the current video frame by taking subtracting the second relative motion vector from the first relative motion vector both of which correspond to the same each of the multiple video frames; obtain the display position of the target motion element of each of the multiple video frames in the current video frame by translating a display position of the target motion element in the current video frame according to the third relative motion vector corresponding to each of the multiple video frames.

In one embodiment, the calculation module 43 is configured to calculate the actual motion track of the target motion element in the multiple video frames according to the display position of the target motion element in each of the multiple video frames and the display position of the background pixel point in each of the multiple video frames; acquire a motion vector of the background pixel point in each group of adjacent video frames in multiple groups of adjacent video frames in the multiple video frames; obtain motion vectors of the background image in the multiple video frames according to motion vectors of the background pixel point in the multiple groups of adjacent video frames;

calculate a display position of the actual motion track in the current video frame according to the motion vectors of the background image in the multiple video frames and the actual motion track.

In one embodiment, the calculation module 43 is configured to calculate the actual motion track of the target motion element in the multiple video frames according to the display position of the target motion element in each of the multiple video frames and the display position of the background pixel point in each of the multiple video frames; calculate the display position of the actual motion track in the current video frame by taking the display position of the target motion element in the current video frame as a terminal point of the actual motion track.

In one embodiment, the calculation module 43 is configured to calculate the actual motion track of the target motion element in the multiple video frames according to the display position of the target motion element in each of the multiple video frames and the display position of the background pixel point in each of the multiple video frames in following manners: a motion vector of the target motion element in each group of adjacent video frames is determined according to display positions of the target motion element in each group of adjacent video frames in the multiple groups of adjacent video frames in the multiple video frames; a motion vector of the background image in each group of adjacent video frames is determined according to display positions of the background pixel point in each group of adjacent video frames in the multiple video frames; an actual motion vector of the target motion element in each group of adjacent video frames is obtained according to the motion vector of the target motion element and the motion vector of the background image in the same each group of adjacent video frames; the actual motion track of the target motion element in the multiple video frames is obtained according to actual motion vectors of the target motion element in the multiple groups of adjacent video frames.

In one embodiment, the calculation module 43 is configured to obtain the actual motion track of the target motion element in the multiple video frames according to the actual motion vectors of the target motion element in the multiple groups of adjacent video frames in a following manner: the actual motion track of the target motion element in the multiple video frames is obtained by directly connecting the actual motion vectors of the target motion element in the multiple groups of video frames in the multiple video frames end to end.

In one embodiment, the calculation module 43 is configured to obtain the actual motion track of the target motion element in the multiple video frames according to the actual motion vectors of the target motion element in the multiple groups of adjacent video frames in following manners: from the actual motion vectors of the target motion element in the multiple groups of adjacent video frames, an actual motion vector of the target motion element in one group of the multiple groups of adjacent video frames is acquired as a first actual motion vector; if the magnitude of the first actual motion vector is less than or equal to a preset threshold, the first actual motion vector is stored; if the magnitude of the first actual motion vector is greater than the preset threshold, a curve with a curvature within a preset range is drawn between a start point of the first actual motion vector and an end point of the first actual motion vector, at least one point is arbitrarily selected in the curve, and two adjacent points among the start point, the at least one point and the end point are connected in a direction from the start point towards the end point to obtain at least two subvectors as new actual motion vectors; the operation of acquiring the first actual motion vector is returned until all the actual motion vectors are acquired, and the stored first actual motion vectors are connected end to end to obtain the actual motion track of the target motion element in the multiple video frames.

In one embodiment, the apparatus further includes an execution module, which is configured to continue to execute the acquisition operation and the subsequent operations for multiple new video frames after the actual motion track of the target motion element in the current video frame is drawn according to the display positions of the target motion element of the multiple video frames in the current video frame, and the current video frame in which the drawing is completed is displayed. The multiple new video frames include a next video frame relative to the current video frame and at least one video frame before the next video frame.

The apparatus for drawing the motion track according to this embodiment of the present disclosure can execute the method for drawing the motion track according to any embodiment of the present disclosure, and has functional modules and beneficial effects corresponding to the method executed.

Embodiment Five

Figure 9:
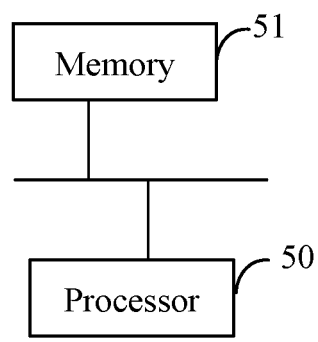
FIG. 9 is a structural diagram of an electronic device according to an embodiment five of the present disclosure.

FIG. 9 is a structural diagram of an electronic device according to the embodiment five of the present disclosure. As shown in FIG. 9, the electronic device includes a processor 50 and a memory 51. The number of processors 50 in the electronic device may be one or more, and one processor 50 is used as an example in FIG. 9. The processor 50 and the memory 51 in the electronic device may be connected through a bus or in other manners. In FIG. 9, the connection through the bus is used as an example.

The memory 51 may be used as a computer-readable storage medium for storing software programs, computer-executable programs and modules, such as the program instructions/modules (such as the acquisition module 41, the identification module 42, the calculation module 43 and the drawing module 44 in the apparatus for drawing the motion track) corresponding to the method for drawing the motion track according to the embodiments of the present disclosure. The processor 50 executes at least one functional application and data processing of the electronic device, that is, implements the method for drawing the motion track, by executing the software programs, instructions and modules stored in the memory 51.

The memory 51 may mainly include a program storage area and a data storage area. The program storage area may store an operating system, at least one application required for functions. The data storage area may store data and the like created according to the usage of the terminal. Furthermore, the memory 51 may include a high speed random access memory, and may also include a nonvolatile memory such as at least one disk memory, flash memory or another nonvolatile solid state memory. In some examples, the memory 51 may include memories which are disposed remotely from the processor 50 and these remote memories may be connected to the electronic device via a network. Examples of the above network include, but are not limited to, the Internet, an intranet, a local area network, a mobile communication network and a combination thereof.

Embodiment Six

The embodiment six of the present disclosure further provides a computer-readable storage medium, which is configured to store computer programs. The computer programs, when executed by a computer processor, are used for performing a method for drawing a motion track. The method includes following steps: multiple video frames are acquired, where the multiple video frames include a current video frame and at least one video frame before the current video frame; a display position of a target motion element in each of the multiple video frames and a display position of a background pixel point in each of the multiple video frames are identified; a display position of the target motion element of each of the multiple video frames in the current video frame is calculated according to the display position of the target motion element in each of the multiple video frames and the display position of the background pixel point in each of the multiple video frames; an actual motion track of the target motion element in the current video frame is drawn according to the display position of the target motion element of the multiple video frames in the current video frame, and the current video frame in which the drawing is completed is displayed.

The computer programs stored in the computer-readable storage medium storing the computer programs provided in the embodiment of the present disclosure is not limited to the operations in the preceding method, and may further perform related operations in the method for drawing the motion track according to any embodiment of the present disclosure.

According to the preceding description of the implementation modes, those skilled in the art may understand that the present disclosure may be implemented by software and general hardware, and may also be implemented by hardware. Based on this understanding, the technical schemes of the present disclosure may be embodied in the form of a software product. The software product may be stored in the computer-readable storage medium, such as a floppy disk, a read-only memory (ROM), a random access memory (RAM), a flash, a hard disk or an optical disk, including multiple instructions for enabling a computer device (which may be a personal computer, a server or a network device) to execute the method according to any embodiment of the present disclosure.

Multiple units and modules involved in the embodiment of the preceding apparatus for drawing the motion track are just divided according to functional logic, and the division is not limited to this, as long as the corresponding functions can be achieved. In addition, the name of each functional unit is just intended for distinguishing, and is not to limit the scope of the present disclosure.

What is claimed is:

1. A method for drawing a motion track, comprising:
acquiring a plurality of video frames, wherein the plurality of video frames comprises a current video frame and at least one video frame before the current video frame;
identifying a display position of a target motion element in each of the plurality of video frames and a display position of a background pixel point in each of the plurality of video frames;
calculating a display position of the target motion element of each of the plurality of video frames in the current video frame according to the display position of the target motion element in each of the plurality of video frames and the display position of the background pixel point in each of the plurality of video frames; and
drawing an actual motion track of the target motion element in the current video frame according to the display position of the target motion element of each of the plurality of video frames in the current video frame, and displaying the current video frame in which the drawing is completed;
wherein calculating the display position of the target motion element of each of the plurality of video frames in the current video frame according to the display position of the target motion element in each of the plurality of video frames and the display position of the background pixel point in each of the plurality of video frames comprises:
calculating a first relative motion vector of the target motion element in each of the plurality of video frames relative to the target motion element in the current video frame according to the display position of the target motion element in each of the plurality of video frames;
calculating a second relative motion vector of a background image in each of the plurality of video frames relative to a background image in the current video frame according to the display position of the background pixel point in each of the plurality of video frames;
obtaining a third relative motion vector of the target motion element of each of the plurality of video frames in the current video frame relative to the target motion element in the current video frame by subtracting the second relative motion vector from the first relative motion vector both of which correspond to the same each of the plurality of video frames; and
obtaining the display position of the target motion element of each of the plurality of video frames in the current video frame by translating a display position of the target motion element in the current video frame according to the third relative motion vector corresponding to each of the plurality of video frames.

2. The method of claim 1, wherein after, drawing the actual motion track of the target motion element in the current video frame according to the display position of the target motion element of each of the plurality of video frames in the current video frame, and displaying the current video frame in which the drawing is completed, the method further comprises:
continuing to execute the acquisition operation and the subsequent operations for a plurality of new video frames, wherein the plurality of new video frames comprises a next video frame relative to the current video frame and at least one video frame before the next video frame.

3. A non-transitory computer-readable storage medium, storing computer programs, wherein the computer programs, when executed by a processor, perform the method for drawing the motion track of claim 1.

4. A method for drawing a motion track, comprising:
acquiring a plurality of video frames, wherein the plurality of video frames comprises a current video frame and at least one video frame before the current video frame;
identifying a display position of a target motion element in each of the plurality of video frames and a display position of a background pixel point in each of the plurality of video frames;
calculating a display position of the target motion element of each of the plurality of video frames in the current video frame according to the display position of the target motion element in each of the plurality of video frames and the display position of the background pixel point in each of the plurality of video frames; and drawing an actual motion track of the target motion element in the current video frame according to the display position of the target motion element of each of the plurality of video frames in the current video frame, and displaying the current video frame in which the drawing is completed;

wherein calculating the display position of the target motion element of each of the plurality of video frames in the current video frame according to the display position of the target motion element in each of the plurality of video frames and the display position of the background pixel point in each of the plurality of video frames comprises:

calculating an actual motion track of the target motion element in the plurality of video frames according to the display position of the target motion element in each of the plurality of video frames and the display position of the background pixel point in each of the plurality of video frames;

acquiring a motion vector of the background pixel point in each group of adjacent video frames in a plurality of groups of adjacent video frames in the plurality of video frames;

obtaining motion vectors of a background image in the plurality of video frames according to motion vectors of the background pixel point in the plurality of groups of adjacent video frames; and calculating a display position of the actual motion track in the current video frame according to the motion vectors of the background image in the plurality of video frames and the actual motion track.

5. The method of claim 4, wherein calculating the actual motion track of the target motion element in the plurality of video frames according to the display position of the target motion element in each of the plurality of video frames and the display position of the background pixel point in each of the plurality of video frames comprises:

determining a motion vector of the target motion element in each group of adjacent video frames according to display positions of the target motion element in each group of adjacent video frames in the plurality of groups of adjacent video frames in the plurality of video frames;

determining a motion vector of the background image in each group of adjacent video frames according to display positions of the background pixel point in each group of adjacent video frames in the plurality of video frames;

obtaining an actual motion vector of the target motion element in each group of adjacent video frames according to the motion vector of the target motion element and the motion vector of the background image in the same each group of adjacent video frames; and obtaining the actual motion track of the target motion element in the plurality of video frames according to actual motion vectors of the target motion element in the plurality of groups of adjacent video frames.

6. The method of claim 5, wherein obtaining the actual motion track of the target motion element in the plurality of video frames according to the actual motion vectors of the target motion element in the plurality of groups of adjacent video frames comprises:

obtaining the actual motion track of the target motion element in the plurality of video frames by connecting the actual motion vectors of the target motion element in the plurality of groups of adjacent video frames in the plurality of video frames end to end; or wherein obtaining the actual motion track of the target motion element in the plurality of video frames according to the actual motion vectors of the target motion element in the plurality of groups of adjacent video frames comprises:

from the actual motion vectors of the target motion element in the plurality of groups of video frames, acquiring an actual motion vector of the target motion element in one group of the plurality of groups of adjacent video frames as a first actual motion vector;

in response to determining that a magnitude of the first actual motion vector is less than or equal to a preset threshold, storing the first actual motion vector; and in response to determining that the magnitude of the first actual motion vector is greater than the preset threshold, drawing a curve with a curvature within a preset range between a start point of the first actual motion vector and an end point of the first actual motion vector, arbitrarily selecting at least one point in the curve, and connecting two adjacent points among the start point, the at least one point and the end point in a direction from the start point towards the end point to obtain at least two subvectors as new actual motion vectors; returning to the operation of acquiring the first actual motion vector until all the actual motion vectors are acquired, and connecting stored first actual motion vectors end to end to obtain the actual motion track of the target motion element in the plurality of video frames.

7. An electronic device, comprising: at least one processor; and a memory, which is configured to store at least one program, wherein the at least one program, when executed by the at least one processor, causes the at least one processor to perform the method for drawing the motion track of claim 4.

8. The electronic device of claim 7, wherein the at least one program, when executed by the at least one processor, causes the at least one processor to perform calculating the actual motion track of the target motion element in the plurality of video frames according to the display position of the target motion element in each of the plurality of video frames and the display position of the background pixel point in each of the plurality of video frames in manners of:

determining a motion vector of the target motion element in each group of adjacent video frames according to display positions of the target motion element in each group of adjacent video frames in the plurality of groups of adjacent video frames in the plurality of video frames;

determining a motion vector of the background image in each group of adjacent video frames according to display positions of the background pixel point in each group of adjacent video frames in the plurality of video frames;

obtaining an actual motion vector of the target motion element in each group of adjacent video frames according to the motion vector of the target motion element and the motion vector of the background image in the same each group of adjacent video frames; and obtaining the actual motion track of the target motion element in the plurality of video frames according to actual motion vectors of the target motion element in the plurality of groups of adjacent video frames.

9. The electronic device of claim 8, wherein the at least one program, when executed by the at least one processor, causes the at least one processor to perform obtaining the actual motion track of the target motion element in the plurality of video frames according to the actual motion vectors of the target motion element in the plurality of groups of adjacent video frames in manners of:

obtaining the actual motion track of the target motion element in the plurality of video frames by connecting the actual motion vectors of the target motion element in the plurality of groups of adjacent video frames in the plurality of video frames end to end; or wherein the actual motion track of the target motion element in the plurality of video frames is obtained according to the actual motion vectors of the target motion element in the plurality of groups of adjacent video frames in manners of:

from the actual motion vectors of the target motion element in the plurality of groups of video frames, acquiring an actual motion vector of the target motion element in one group of the plurality of groups of adjacent video frames as a first actual motion vector;

in response to determining that a magnitude of the first actual motion vector is less than or equal to a preset threshold, storing the first actual motion vector; and in response to determining that the magnitude of the first actual motion vector is greater than the preset threshold, drawing a curve with a curvature within a preset range between a start point of the first actual motion vector and an end point of the first actual motion vector, arbitrarily selecting at least one point in the curve, and connecting two adjacent points among the start point, the at least one point and the end point in a direction from the start point towards the end point to obtain at least two subvectors as new actual motion vectors; returning to the operation of acquiring the first actual motion vector until all the actual motion vectors are acquired, and connecting stored first actual motion vectors end to end to obtain the actual motion track of the target motion element in the plurality of video frames.

10. The electronic device of claim 7, wherein the at least one program, when executed by the at least one processor, causes the at least one processor to further perform:

continuing to execute the acquisition operation and the subsequent operations for a plurality of new video frames, wherein the plurality of new video frames comprises a next video frame relative to the current video frame and at least one video frame before the next video frame.

11. The method of claim 4, wherein after, drawing the actual motion track of the target motion element in the current video frame according to the display position of the target motion element of each of the plurality of video frames in the current video frame, and displaying the current video frame in which the drawing is completed, the method further comprises:

continuing to execute the acquisition operation and the subsequent operations for a plurality of new video frames, wherein the plurality of new video frames comprises a next video frame relative to the current video frame and at least one video frame before the next video frame.

12. A non-transitory computer-readable storage medium, storing computer programs, wherein the computer programs, when executed by a processor, perform the method for drawing the motion track of claim 4.

13. An electronic device, comprising: at least one processor; and a memory, which is configured to store at least one program, wherein the at least one program, when executed by the at least one processor, comprises:

an acquisition module, which is configured to acquire a plurality of video frames, wherein the plurality of video frames comprises a current video frame and at least one video frame before the current video frame; an identification module, which is configured to identify a display position of a target motion element in each of the plurality of video frames and a display position of a background pixel point in each of the plurality of video frames;

a calculation module, which is configured to calculate a display position of the target motion element of each of the plurality of video frames in the current video frame according to the display position of the target motion element in each of the plurality of video frames and the display position of the background pixel point in each of the plurality of video frames; and a drawing module, which is configured to draw an actual motion track of the target motion element in the current video frame according to the display position of the target motion element of each of the plurality of video frames in the current video frame, and display the current video frame in which the drawing is completed;

wherein the calculation module is configured to:

calculate a first relative motion vector of the target motion element in each of the plurality of video frames relative to the target motion element in the current video frame according to the display position of the target motion element in each of the plurality of video frames;

calculate a second relative motion vector of a background image in each of the plurality of video frames relative to a background image in the current video frame according to the display position of the background pixel point in each of the plurality of video frames;

obtain a third relative motion vector of the target motion element of each of the plurality of video frames in the current video frame relative to the target motion element in the current video frame by subtracting the second relative motion vector from the first relative motion vector both of which correspond to the same each of the plurality of video frames; and obtain the display position of the target motion element of each of the plurality of video frames in the current video frame by translating a display position of the target motion element in the current video frame according to the third relative motion vector corresponding to each of the plurality of video frames.

14. The electronic device of claim 13, further comprising: an execution module, which is configured to continue to execute the acquisition operation and the subsequent operations for a plurality of new video frames, wherein the plurality of new video frames comprises a next video frame relative to the current video frame and at least one video frame before the next video frame.

* * * * *